(12) United States Patent
Shimoyama et al.

(10) Patent No.: US 10,940,904 B2
(45) Date of Patent: Mar. 9, 2021

(54) ASSEMBLY APPARATUS

(71) Applicant: HONDA MOTOR CO., LTD, Tokyo (JP)

(72) Inventors: Masao Shimoyama, Tochigi-ken (JP); Kazuki Akami, Tochigi-ken (JP); Kazuhisa Hada, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 15/704,221

(22) Filed: Sep. 14, 2017

(65) Prior Publication Data

US 2018/0079460 A1    Mar. 22, 2018

(30) Foreign Application Priority Data

Sep. 20, 2016 (JP) .................................. 2016-182751

(51) Int. Cl.
| | | |
|---|---|---|
| B62D 65/02 | (2006.01) | |
| B23K 37/04 | (2006.01) | |
| B62D 65/06 | (2006.01) | |
| B23K 31/02 | (2006.01) | |

(52) U.S. Cl.
CPC ............ *B62D 65/024* (2013.01); *B23K 37/04* (2013.01); *B62D 65/06* (2013.01); *B23K 31/02* (2013.01)

(58) Field of Classification Search
CPC ....... B62D 65/024; B62D 65/06; B23K 37/04
See application file for complete search history.

(56) References Cited

U.S. PATENT DOCUMENTS

| | | | | |
|---|---|---|---|---|
| 4,538,044 | A | * | 8/1985 | Kadowaki ............ B23K 37/047 219/79 |
| 5,380,978 | A | * | 1/1995 | Pryor ................... B23K 26/032 219/121.64 |

(Continued)

FOREIGN PATENT DOCUMENTS

| | | | |
|---|---|---|---|
| JP | 2004130834 A | * | 4/2004 |
| JP | 2008-027210 | | 2/2008 |
| JP | 2014-008579 | | 1/2014 |

(Continued)

OTHER PUBLICATIONS

Machine Translation of KR-20100054534-A (Year: 2010).*

(Continued)

*Primary Examiner* — Jacob J Cigna
*Assistant Examiner* — Michael W Hotchkiss
(74) *Attorney, Agent, or Firm* — Amin, Turocy & Watson, LLP

(57) ABSTRACT

An assembly apparatus is constituted to include positioning mechanisms for aligning the positions of side panels and a roof panel. For example, a front positioning mechanism includes a first base portion disposed on a first distal end arm of a front side robot, roof positioning members and side panel positioning members supported displaceably by the first base portion, a right front beam member and a left front beam member extending along a vehicle widthwise direction from the first base portion, a first left marking member and a first right marking member disposed at respective distal ends of the beam members, and a left visual sensor and a right visual sensor for detecting positions of each of the first left marking member and the first right marking member.

9 Claims, 5 Drawing Sheets

(56) References Cited

U.S. PATENT DOCUMENTS

| | | | | |
|---|---|---|---|---|
| 5,409,158 | A * | 4/1995 | Angel | B23K 37/0435 |
| | | | | 228/182 |
| 6,167,607 | B1 | 1/2001 | Pryor | |
| 6,414,711 | B2 * | 7/2002 | Arimatsu | G05B 19/404 |
| | | | | 348/130 |
| 6,509,576 | B2 * | 1/2003 | Woo-Dong | B25J 9/1692 |
| | | | | 250/559.33 |
| 6,691,392 | B2 * | 2/2004 | Savoy | B62D 65/06 |
| | | | | 29/407.01 |
| 7,746,483 | B2 * | 6/2010 | Tassakos | B62D 65/06 |
| | | | | 356/614 |
| 8,046,895 | B2 * | 11/2011 | Sherrill | B25J 15/0061 |
| | | | | 29/468 |
| 9,769,930 | B2 * | 9/2017 | VanDerPuy | H05K 3/0008 |
| 9,789,462 | B2 * | 10/2017 | Singh | B01J 19/121 |
| 9,889,896 | B2 * | 2/2018 | Nakamura | B23K 31/02 |
| 2015/0158181 | A1 * | 6/2015 | Kawamura | B25J 9/1697 |
| | | | | 700/259 |

FOREIGN PATENT DOCUMENTS

| | | | |
|---|---|---|---|
| JP | 2014-129024 | | 7/2014 |
| KR | 20100054534 | A * | 5/2010 |
| WO | 2013/176212 | | 11/2013 |

OTHER PUBLICATIONS

JP-2004130834-A Machine Translation (Year: 2004).*
Japanese Office Action for Japanese Patent Application No. 2016-182751 dated Apr. 3, 2018.
Canadian Office Action for Canadian Patent Application No. 2979473 dated Sep. 25, 2018.

* cited by examiner

ASSEMBLY APPARATUS

CROSS-REFERENCE TO RELATED APPLICATION

This application is based upon and claims the benefit of priority from Japanese Patent Application No. 2016-182751 filed on Sep. 20, 2016, the contents of which are incorporated herein by reference.

BACKGROUND OF THE INVENTION

Field of the Invention

The present invention relates to an assembly apparatus adapted to assemble a vehicle body by attaching a roof panel to side panels.

Description of the Related Art

In a process of manufacturing a car body, a step is included by which a roof panel is welded to side panels. Prior to carrying out welding, positioning is performed in order to align the relative positions of the side panels and the roof panel. This is because, by carrying out positioning in this manner, welding of the roof panel at proper positions of the side panels is facilitated.

In Japanese Laid-Open Patent Publication No. 2014-129024, the applicant of the present application has proposed a vehicle body assembly apparatus equipped with a clamping jig including a coupling tool for positioning the side panels, and clamping or pressing the roof panel to the side panels, a roof transporting robot for transporting the roof panel onto the positioned side panels, and a welding robot for welding the side panels and the roof panel. The clamping jig is transported by a jig robot.

In this instance, an amount by which an arm of the robot is operated may differ depending on a change in temperature, for example. Consequently, in the case that the clamping jig is transported by the jig robot in the above-described manner, there is a concern that, due to differences in the amounts by which the arm is operated, errors may occur in the transported position of the clamping jig.

Thus, according to the assembly apparatus disclosed in Japanese Laid-Open Patent Publication No. 2014-129024, a support column is provided having a jig coupling mechanism disposed at an upper end of the support column. By connecting the coupling tool to the jig coupling mechanism, errors of the clamping jig with respect to the ground are absorbed.

SUMMARY OF THE INVENTION

In the configuration described above, the weight of the clamping jig acts on the support column. Therefore, it is necessary to construct the jig coupling mechanism, the support column, and the coupling tool so as to exhibit sufficient rigidity. As a result, the assembly apparatus becomes large in scale. Further, it is not easy to prevent the coupling tool from interfering with the side panels.

A principal object of the present invention is to provide an assembly apparatus having a simple structure.

Another object of the present invention is to provide an assembly apparatus which facilitates relative positioning between side panels and a roof panel.

According to an embodiment of the present invention, an assembly apparatus is provided for assembling a vehicle body by attaching a roof panel to side panels, and comprising a positioning mechanism for aligning positions of the side panels and the roof panel, wherein the positioning mechanism comprises:

a robot;

a base portion attached to a distal end arm of the robot;

roof positioning members supported on the base portion on outer sides thereof in a vehicle widthwise direction for positioning the roof panel;

side panel positioning members supported on the base portion on outer sides thereof in the vehicle widthwise direction for positioning the side panels;

a first beam member and a second beam member extending along the vehicle widthwise direction from the base portion;

a right marking member disposed on a distal end of the first beam member;

a left marking member disposed on a distal end of the second beam member;

a left visual sensor configured to detect a position of the left marking member; and a right visual sensor configured to detect a position of the right marking member;

wherein the left visual sensor and the right visual sensor are disposed respectively on left and right sides of the vehicle body.

More specifically, in the present invention, absolute positions of the marking portions are detected by the visual sensors, and an amount of deviation of the absolute positions from reference positions therefor is obtained. Then, the robot performs a corrective operation in order to offset or cancel out the amount of deviation. In accordance with this feature, the side panels and the roof panel are positioned in alignment with each other. In this manner since it is possible to perform the corrective operation using the visual sensors, there is no need to provide a jig coupling mechanism, a support column, and a coupling tool, etc., which are high in rigidity. Consequently, it is possible to avoid an increase in the size and scale of the assembly apparatus, together with simplifying the structure thereof.

A moving mechanism which is moved along a longitudinal direction of the vehicle body may be provided in the assembly apparatus. In this case, a first groove and a second groove may be formed respectively on right and left sides in the vehicle widthwise direction of the moving mechanism, and the right visual sensor and the left visual sensor and the robot may be installed externally of the first groove and the second groove.

The first groove and the second groove block vibrations generated from the moving mechanism. Therefore, propagation of vibrations to the left visual sensor, the right visual sensor, and the robot is avoided. Accordingly, the detection accuracy of the marking members by the left visual sensor and the right visual sensor is improved, and the roof positioning members and the side panel positioning members position the roof panel and the side panels respectively without being subjected to vibrations.

In such a configuration, cameras can be cited as preferred examples for the left visual sensor and the right visual sensor.

The left visual sensor preferably is constituted by a lower left visual sensor having an optical axis which is oriented upward, and an upper left visual sensor having an optical axis which is oriented inwardly in the vehicle widthwise direction. Similarly, the right visual sensor preferably is constituted by a lower right visual sensor having an optical axis which is oriented upward, and an upper right visual sensor having an optical axis which is oriented inwardly in the vehicle widthwise direction. In this case, the lower left visual sensor and the lower right visual sensor are configured to detect front and rear displacements and right and left displacements of the left marking member and the right marking member, respectively. On the other hand, the upper left visual sensor and the upper right visual sensor are configured to detect front and rear displacements and upper and lower (vertical) displacements of the left marking member and the right marking member, respectively. In accordance with the above, it is possible to obtain a three-dimensional amount of deviation (amount of twisting) from a reference position of the roof positioning members and the side panel positioning members. Accordingly, for example, it is possible to correct the vehicle body so as to come nearer toward an ideal reference posture.

In this case, the left marking member may include a lower left marking detected by the lower left visual sensor, and a left side marking detected by the upper left visual sensor. Likewise, the right marking member also preferably includes a lower right marking detected by the lower right visual sensor, and a right side marking detected by the upper right visual sensor. In accordance with this feature, it is possible to more accurately detect displacements to the left and right and to the front and rear of the left marking members and the right marking members.

In this case as well, cameras can be cited as preferred examples for the lower left visual sensor, the upper left visual sensor, the lower right visual sensor, and the upper right visual sensor.

In order to make the upper left visual sensor and the upper right visual sensor higher than the lower left visual sensor and the lower right visual sensor, the upper left visual sensor may be supported by a second support column, and the upper right visual sensor may be supported by a first support column.

In either case, preferably the left marking member and the right marking member are arranged more outwardly in the vehicle widthwise direction than the roof positioning members and the side panel positioning members. For example, the deflection amount of the beam members by which the vehicle body deviates from the reference posture becomes larger outwardly than inwardly of the vehicle body. Accordingly, the sensitivity upon detection of the marking members by the visual sensors is favorable. Stated otherwise, even if the amount of deviation of the vehicle body is small, since the deflection amount is large at the ends of the beam members, it is possible for such deviation to be detected.

Therefore, the corrective amount by which the robot should be operated in order to cancel out such an amount of deviation can be obtained with high accuracy. As a result, the accuracy of the correction is enhanced.

Preferably, so that positioning of the roof panel can be performed, the roof positioning members are configured to be displaced along the vehicle widthwise direction and a vehicle heightwise direction. Further, preferably, in order to enable positioning of the side panels, the side panel positioning members are configured to be displaced along the vehicle widthwise direction.

A ball screw mechanism, a rack and pinion mechanism, or an air cylinder mechanism may be used, for example, for displacing the roof positioning members and the side panel positioning members.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
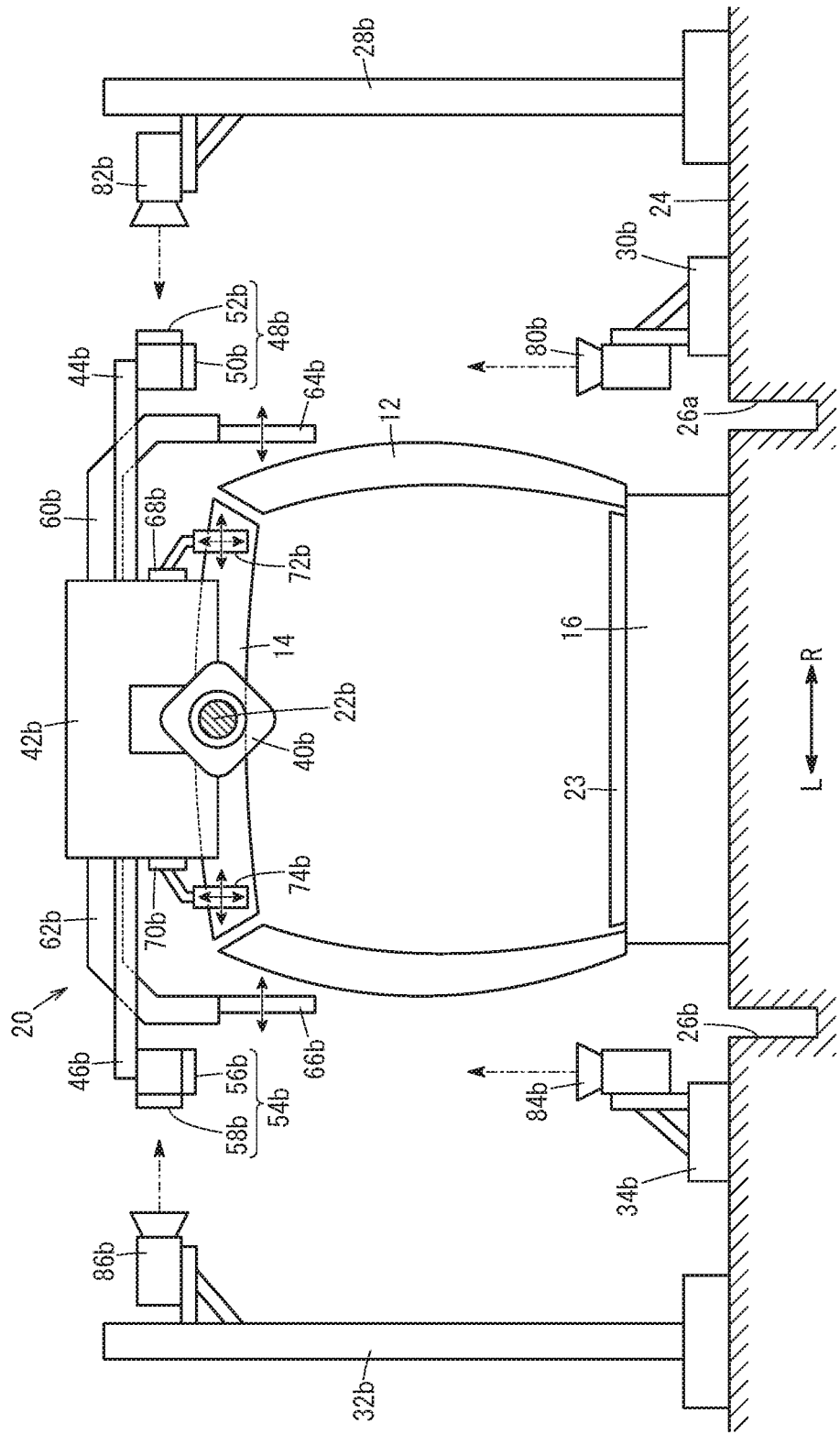
FIG. 1 is a schematic rear view of principal components of an assembly apparatus according to an embodiment of the present invention.

A preferred embodiment of an assembly apparatus according to the present invention will be described in detail below with reference to the accompanying drawings. In the following description, the terms "front", "rear", "left", and "right" refer to the front direction, the rear direction, the left direction, and the right direction, as viewed from the perspective of a user who is seated in the driver's seat of an automobile. The same applies to the indications "Fr", "Rr", "L", and "R" appearing in the drawings.

Figure 2:
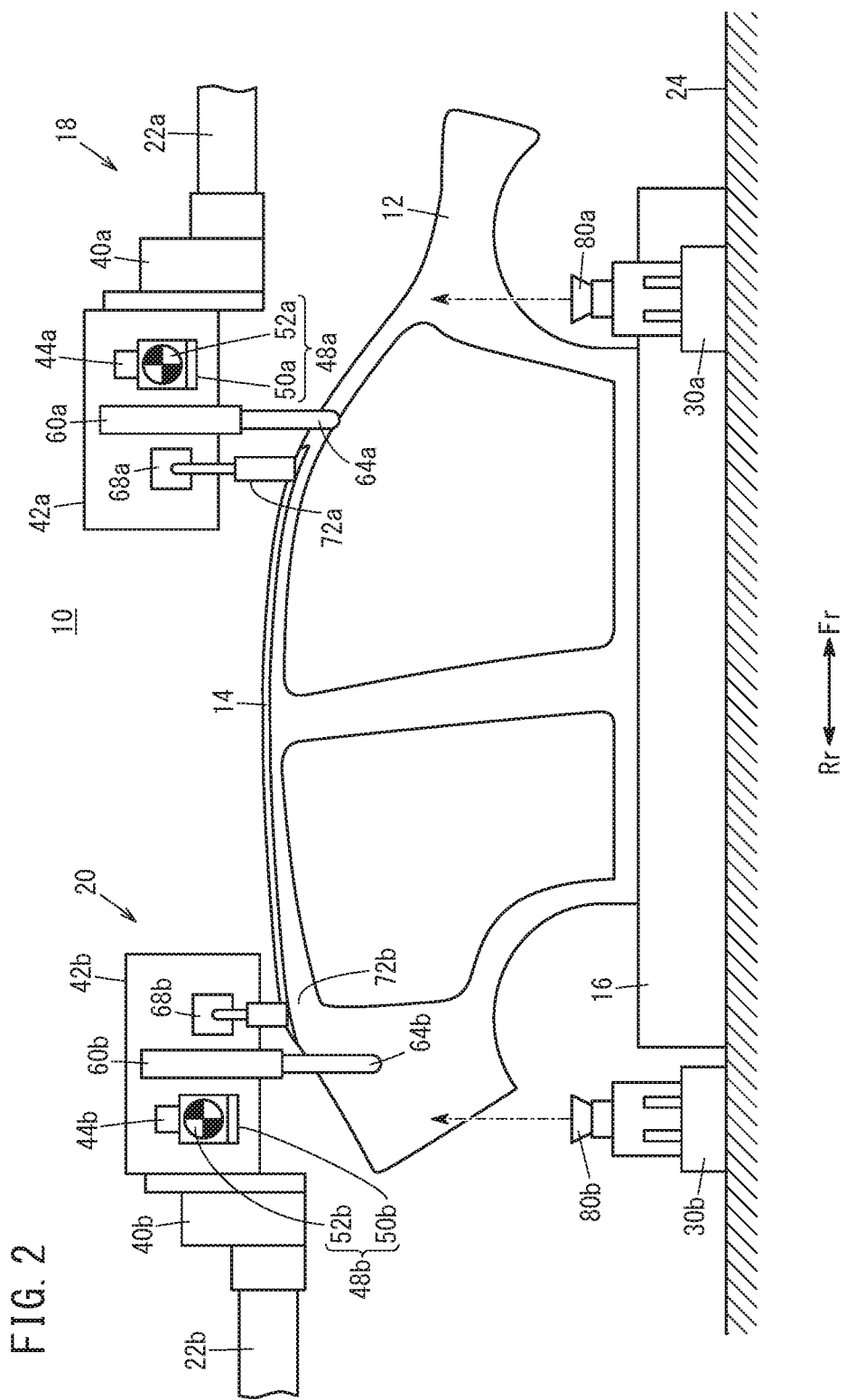
FIG. 2 is a schematic right side view of principal components of the assembly apparatus in FIG. 1.
Figure 3:
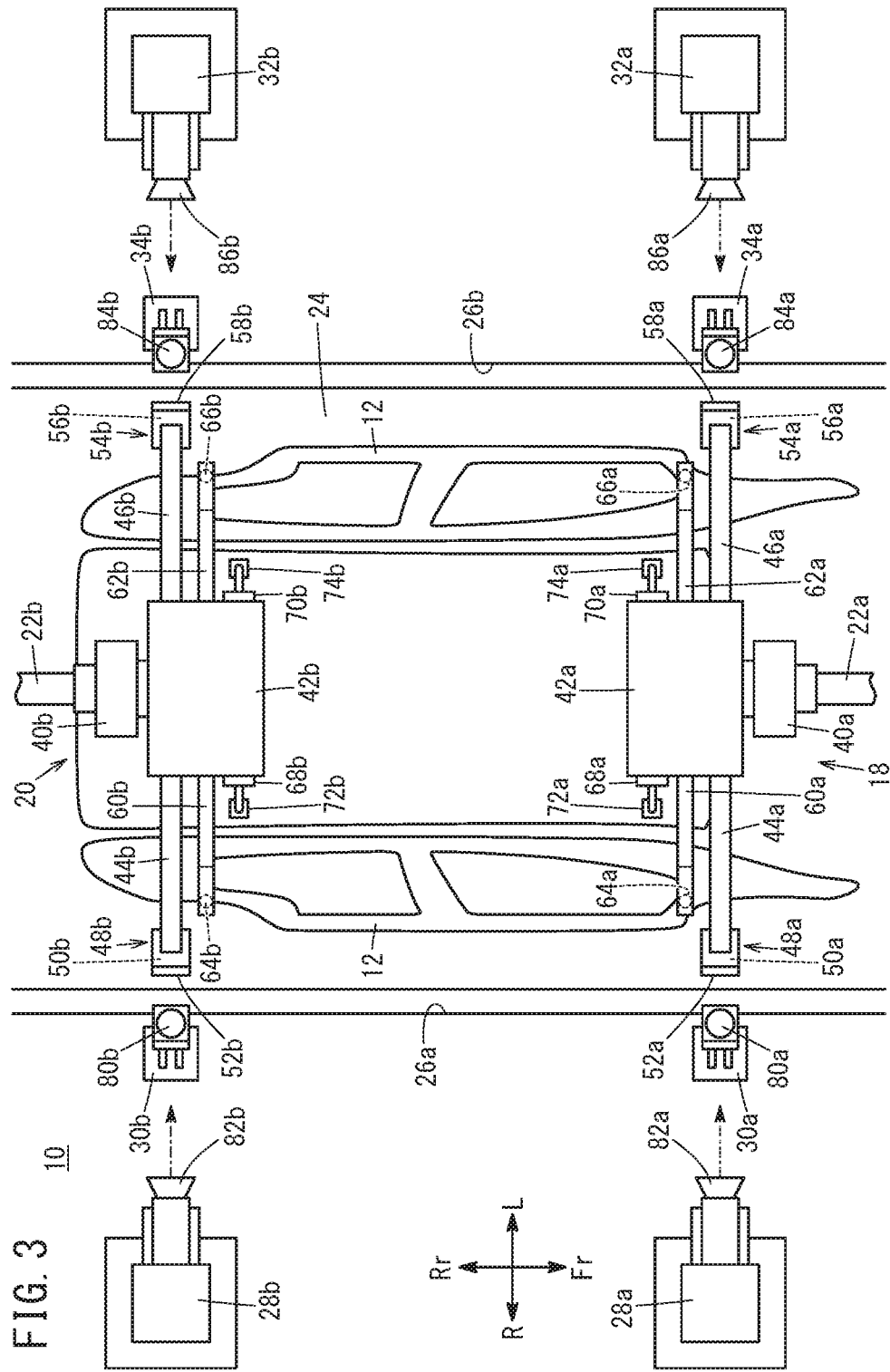
FIG. 3 is a schematic plan view of the assembly apparatus in FIG. 1.

FIGS. 1 to 3, respectively, are a schematic rear view, a schematic right side view, and a schematic plan view of principal components of an assembly apparatus 10 according to the present embodiment. The assembly apparatus 10 is for the purpose of assembling a vehicle body by attachment of a roof panel 14 to respective side panels 12. The assembly apparatus 10 includes a moving mechanism 16 for moving the vehicle body, a front positioning mechanism 18 positioned in front of the vehicle body, and a rear positioning mechanism 20 positioned at the rear of the vehicle body. The front positioning mechanism 18 and the rear positioning mechanism 20 are constituted to include a front side robot and a rear side robot, for which there are illustrated only a first distal end arm 22a and a second distal end arm 22b, respectively. Reference numeral 23 indicates a floor panel.

The moving mechanism 16 includes, for example, a conveyor disposed on a floor 24 (refer in particular to FIG. 1). In this case, the side panels 12 are conveyed in a state of being placed on the conveyor, in such a manner that the front of the vehicle where the driver's seat is located faces toward the upstream side. Stated otherwise, the conveyor is positioned below the side panels 12 as viewed from the side. Further, the direction of conveyance is the rear side in the direction of travel of the vehicle body. More specifically, the downstream side in the direction of conveyance is to the left in FIG. 2, and upwardly in FIG. 3.

In particular, as shown in FIG. 3, a first groove 26a and a second groove 26b, which extend substantially in parallel with the conveyor, are formed outwardly of the conveyor, and more specifically, on right and left outer sides in the vehicle widthwise direction. Moreover, although not shown specifically, the first groove 26a and the second groove 26b may be covered with lids such as a grating or the like.

A right front support column 28a (first support column), a right rear support column 28b (first support column), and a front side robot are disposed in an upright manner on the outer side of the first groove 26a. A right front pedestal 30a and a right rear pedestal 30b are disposed between the first groove 26a and the right front support column 28a and the right rear support column 28b, respectively. Similarly, a left front support column 32a (second support column), a left rear support column 32b (second support column), and a rear side robot are disposed in an upright manner on the outer side of the second groove 26b, and together therewith, a left front pedestal 34a and a left rear pedestal 34b are disposed between the second groove 26b and the left front support column 32a and the left rear support column 32b, respectively.

Conversely to the aforementioned features, the front side robot may be disposed in an upright manner on an outer side of the second groove 26b, whereas the rear side robot may be disposed in an upright manner on an outer side of the first groove 26a. Furthermore, both the front side robot and the rear side robot may be disposed in an upright manner on an outer side from either one of the first groove 26a or the second groove 26b.

In relation to the description of the front positioning mechanism 18, the first distal end arm 22a of the front positioning mechanism 18 is connected to a first base portion 42a via a first ATC (automatic tool changer) 40a. A right front beam member 44a (first beam member) and a left front beam member 46a (second beam member) project outwardly from the first base portion 42a and extend along the vehicle widthwise direction. The right front beam member 44a and the left front beam member 46a may be respective end portions of one beam member, which is inserted through an insertion hole formed in the first base portion 42a, or may also be respective individual beam members.

A terminal end portion of the right front beam member 44a is positioned more outwardly than the right side surface of the side panel 12. A first right marking member 48a is disposed on the terminal end portion. The first right marking member 48a includes a first lower right marking 50a facing vertically downward, and a first right side marking 52a facing in an outer rightward direction.

On the other hand, a terminal end portion of the left front beam member 46a is positioned more outwardly than the left side surface of the side panel 12, and a first left marking member 54a is disposed on the terminal end portion. The first left marking member 54a includes a first lower left marking 56a facing vertically downward, and a first left side marking 58a facing in an outer leftward direction. A separation distance between the first base portion 42a and the first right marking member 48a, and a separation distance between the first base portion 42a and the first left marking member 54a are substantially equivalent.

Figure 4:
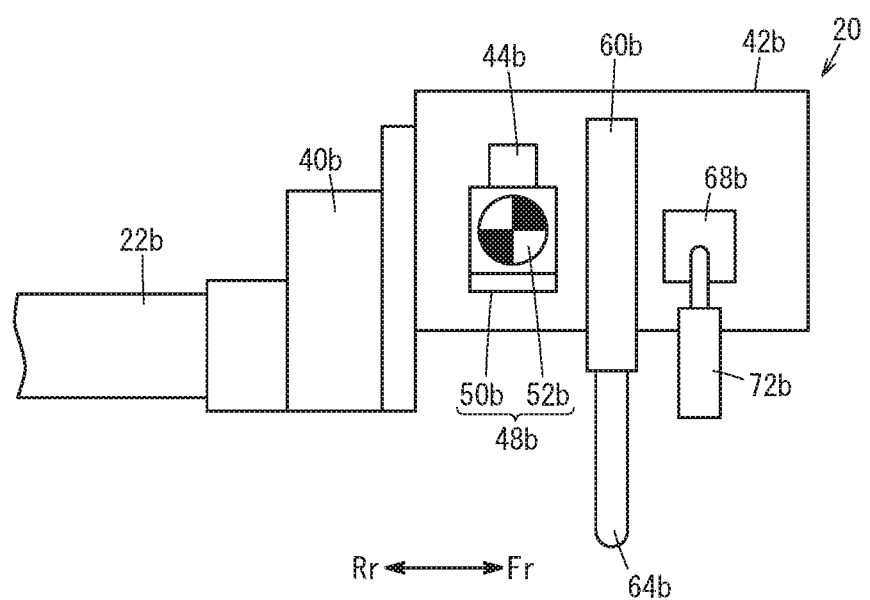
FIG. 4 is an enlarged side view of principal components of a rear positioning mechanism of the assembly apparatus in FIG. 1.

As shown in FIGS. 3 and 4, on the first base portion 42a, there are additionally provided rearwardly of the right front beam member 44a and the left front beam member 46a, a first right front arm member 60a that extends along the vehicle widthwise direction, and a first left front arm member 62a that extends along the vehicle widthwise direction. The first right front arm member 60a and the first left front arm member 62a are provided respectively with a right front side panel positioning member 64a, and a left front side panel positioning member 66a. The right front side panel positioning member 64a and the left front side panel positioning member 66a can be displaced in the vehicle widthwise direction, for example, by a rack and pinion mechanism, a cylinder, or the like. Moreover, the first right front arm member 60a and the first left front arm member 62a may be constituted so as to be capable of being displaced along the vehicle widthwise direction.

Further, rearwardly of the first right front arm member 60a and the first left front arm member 62a, there are provided a second right front arm member 68a that extends along the vehicle widthwise direction, and a second left front arm member 70a that extends along the vehicle widthwise direction. The second right front arm member 68a and the second left front arm member 70a are shorter than the first right front arm member 60a and the first left front arm member 62a, and a right front roof positioning member 72a, and a left front roof positioning member 74a are disposed at terminal end portions thereof. The right front roof positioning member 72a and the left front roof positioning member 74a are capable of being displaced along the vehicle widthwise direction and the vehicle heightwise (vertical) direction, for example, by a ball screw mechanism, a rack and pinion mechanism, an air cylinder mechanism, or the like.

In the above-described configuration, the respective distances between the first base portion 42a and the first right marking member 48a, the right front side panel positioning member 64a, and the right front roof positioning member 72a, are substantially equivalent to the respective distances between the first base portion 42a and the first left marking member 54a, the left front side panel positioning member 66a, and the left front roof positioning member 74a.

A front lower right visual sensor 80a (for example, a camera, which also applies to the following descriptions below) having an optical axis which is oriented upward is disposed on the right front pedestal 30a. A front upper right visual sensor 82a having an optical axis, which is oriented inwardly in the vehicle widthwise direction, is provided on the right front support column 28a. Further, a front lower left visual sensor 84a having an optical axis which is oriented upward is disposed on the left front pedestal 34a, and a front upper left visual sensor 86a having an optical axis, which is oriented inwardly in the vehicle widthwise direction, is provided on the left front support column 32a. The front lower right visual sensor 80a and the front upper right visual sensor 82a constitute a right visual sensor, whereas the front lower left visual sensor 84a and the front upper left visual sensor 86a constitute a left visual sensor.

The rear positioning mechanism 20 is configured substantially in the same manner as the front positioning mechanism 18. More specifically, the second distal end arm 22b of the rear side robot is connected to a second base portion 42b via a second ATC 40b. A second right rear arm member 68b and a second left rear arm member 70b, a first right rear arm member 60b and a first left rear arm member 62b, and a right rear beam member 44b (first beam member) and a left rear beam member 46b (second beam member), which extend along the vehicle widthwise direction, project outwardly from the second base portion 42b, and extend alongside one another in this order from the front side of the vehicle body.

A right rear roof positioning member 72b and a left rear roof positioning member 74b are disposed at respective terminal end portions of the second right rear arm member 68b and the second left rear arm member 70b. The right rear roof positioning member 72b and the left rear roof positioning member 74b, in the same manner as the right front roof positioning member 72a and the left front roof positioning member 74a, are capable of being displaced along the vehicle widthwise direction and the vehicle heightwise (vertical) direction, for example, by a ball screw mechanism, a rack and pinion mechanism, an air cylinder mechanism, or the like.

A right rear side panel positioning member 64b and a left rear side panel positioning member 66b are disposed respectively at each of terminal end portions of the comparatively longer first right rear arm member 60b and the first left rear arm member 62b. The right rear side panel positioning member 64b and the left rear side panel positioning member 66b can be displaced in the vehicle widthwise direction, for example, by a ball screw mechanism, a rack and pinion mechanism, an air cylinder mechanism, or the like.

A second right marking member 48b, including a second lower right marking 50b facing vertically downward, and a second right side marking 52b facing outwardly to the right, is disposed on a terminal end portion of the right rear beam member 44b at a more outward position than the right side surface of the side panel 12. In the same manner, a second left marking member 54b, including a second lower left marking 56b facing vertically downward, and a second left side marking 58b facing outwardly to the left, is disposed on a terminal end portion of the left rear beam member 46b at a more outward position than the left side surface of the side panel 12.

In addition, the respective distances between the second base portion 42b and the right rear roof positioning member 72b, the right rear side panel positioning member 64b, and the second right marking member 48b are substantially equivalent to the respective distances between the second base portion 42b and the left rear roof positioning member 74b, the left rear side panel positioning member 66b, and the second left marking member 54b.

A rear lower right visual sensor 80b and a rear upper right visual sensor 82b are disposed respectively on the right rear pedestal 30b and the right rear support column 28b. The optical axis of the rear lower right visual sensor 80b is oriented upward, whereas the optical axis of the rear upper right visual sensor 82b is oriented inwardly in the vehicle widthwise direction. Similarly, a rear lower left visual sensor 84b having an optical axis which is oriented upward is disposed on the left rear pedestal 34b, and a rear upper left visual sensor 86b having an optical axis, which is oriented inwardly in the vehicle widthwise direction, is provided on the left rear support column 32b. The rear lower right visual sensor 80b and the rear upper right visual sensor 82b constitute a right visual sensor, and the rear lower left visual sensor 84b and the rear upper left visual sensor 86b constitute a left visual sensor.

The assembly apparatus 10 further includes a welding robot having a welding gun (neither of which are shown). The welding robot fulfills a role of welding mutually facing abutting portions of the side panels 12 and the roof panel 14, which are positioned in alignment with each other.

The assembly apparatus 10 according to the present embodiment is constructed basically as described above. Next, operations and effects thereof will be described in relation to operations carried out when positioning the roof panel 14 with respect to the side panels 12.

First, the vehicle body, on which the floor panel 23, the side panels 12, and the roof panel 14 are combined together provisionally, is transported by the moving mechanism 16 to a position located between the front side robot and the rear side robot. During conveyance thereof, a concern arises in that vibrations could propagate from the moving mechanism 16 to the floor 24, however, such vibrations are blocked by the first groove 26a and the second groove 26b, which are formed in the floor 24. More specifically, the first groove 26a and the second groove 26b absorb the vibrations. Therefore, since it is difficult for vibrations to propagate to the aforementioned pedestals 30a, 30b, 34a, 34b and the support columns 28a, 28b, 32a, 32b, the visual sensors 80a, 80b, 82a, 82b, 84a, 84b, 86a, 86b are prevented from being vibrated themselves.

Next, the first distal end arm 22a of the front side robot is suitably operated, whereupon the right front roof positioning member 72a and the left front roof positioning member 74a of the front positioning mechanism 18 are respectively positioned in the right front and the left front of the roof panel 14. Together therewith, the right front side panel positioning member 64a and the left front side panel positioning member 66a are respectively positioned in the right front and the left front of the side panels 12. Substantially at the same time, the distal end arm 22b of the rear side robot is suitably operated, whereupon the right rear roof positioning member 72b and the left rear roof positioning member 74b of the rear positioning mechanism 20 are respectively positioned in the right rear and the left rear of the roof panel 14, and together therewith, the right rear side panel positioning member 64b and the left rear side panel positioning member 66b are respectively positioned in the right rear and the left rear of the side panels 12.

In this state, the four roof positioning members 72a, 72b, 74a, 74b are suitably displaced to the right and left, or up and down, and thereby apply pressure slightly to the roof panel 14. Further, the four side panel positioning members 64a, 64b, 66a, 66b are suitably displaced to the right and left, and thereby apply pressure slightly to the side panels 12. In accordance with this feature, the side panels 12 and the roof panel 14 are provisionally positioned (in alignment) with each other.

The first groove 26a and the second groove 26b are interposed between the vehicle body and the front side robot as well as the rear side robot. Therefore, for the same reasons as discussed above, vibrations of the moving mechanism 16 are prevented from propagating to the front side robot and the rear side robot. Consequently, it is possible to avoid the occurrence of vibrations in the front side robot and the rear side robot, in addition to the roof positioning members 72a, 72b, 74a, 74b and the side panel positioning members 64a, 64b, 66a, 66b, etc. In accordance with this feature, the accuracy of positioning the side panels 12 and the roof panel 14 in alignment with each other is improved.

In this instance, the front lower right visual sensor 80a monitors the first lower right marking 50a, whereas the front upper right visual sensor 82a monitors the first right side marking 52a. Further, the front lower left visual sensor 84a monitors the first lower left marking 56a, and the front upper left visual sensor 86a monitors the first left side marking 58a. Similarly, the rear lower right visual sensor 80b monitors the second lower right marking 50b, whereas the rear upper right visual sensor 82b monitors the second right side marking 52b. Further, the rear lower left visual sensor 84b monitors the second lower left marking 56b, and the rear upper left visual sensor 86b monitors the second left side marking 58b, respectively.

The front lower right visual sensor 80a, the front lower left visual sensor 84a, the rear lower right visual sensor 80b, and the rear lower left visual sensor 84b detect the degree to which the amounts of positional deviation have occurred to the front and rear as well as the right and left of the first lower right marking 50a, the first lower left marking 56a, the second lower right marking 50b, and the second lower left marking 56b. On the other hand, the front upper right visual sensor 82a, the front upper left visual sensor 86a, the rear upper right visual sensor 82b, and the rear upper left visual sensor 86b detect the degree to which the amounts of positional deviation have occurred to the front and rear as well as up and down of the first right side marking 52a, the first left side marking 58a, the second right side marking 52b, and the second left side marking 58b. As a result, the amount of three-dimensional deviation from the reference posture of the vehicle body can be obtained. Hereinafter, the three-dimensional deviation from the reference posture will be expressed as "twisting", and the amount of three-dimensional deviation will be expressed as an "amount of twisting".

The first right marking member 48a, the first left marking member 54a, the second right marking member 48b, and the second left marking member 54b are arranged more outwardly in the vehicle widthwise direction in comparison with the roof positioning members 72a, 72b, 74a, 74b and the side panel positioning members 64a, 64b, 66a, 66b. Therefore, the respective visual sensors 80a, 80b, 82a, 82b, 84a, 84b, 86a, 86b are superior in terms of their sensitivity with respect to twisting. This is because, in the case that deviation of the vehicle body occurs (twisting occurs) from the reference posture, the deflection amounts of the right front beam member 44a, the left front beam member 46a, the right rear beam member 44b, and the left rear beam member 46b becomes larger outwardly than inwardly of the vehicle body.

Such an amount of twisting is transmitted as control information to the front side robot and the rear side robot. Accordingly, the front side robot and the rear side robot perform a corrective operation, so that the amount of twisting is canceled out, or in other words, so that amounts of twisting in the front and rear, the right and left, and up and down are reduced to zero. Along therewith, the postures of the base portions 42a, 42b are corrected, and the roof positioning members 72a, 72b, 74a, 74b and the side panel positioning members 64a, 64b, 66a, 66b are placed in reference positions where no positional deviation thereof occurs. As a result, the posture of the vehicle body can be corrected.

As described above, according to the present embodiment, twisting can be detected with high sensitivity. Consequently, in order to correct the posture of the vehicle body and cancel out the amount of twisting insofar as possible, it is possible to precisely determine the extent to which the front side robot and the rear side robot should carry out their corrective operations. Therefore, the accuracy of such corrective operations is improved.

By performing corrections as described above, for example, even if the amounts by which the distal end arms 22a, 22b are operated differ due to a rise or fall in temperature, the posture of the vehicle body can easily be corrected. More specifically, if errors occur in the amounts by which the distal end arms 22a, 22b are moved, such errors can be absorbed as a result of such corrections.

Next, the welding robot is operated so that the welding gun is moved along portions where the side panels 12 and the roof panel 14 are in abutment with each other. The side panels 12 and the roof panel 14 are joined together by the welding gun carrying out welding on the portions that are placed in abutment with each other. In other words, the car body is assembled. Since the accuracy of the correction is good, it is possible for the roof panel 14 and the side panels 12 to be attached together with high accuracy.

As described above, according to the present embodiment, when twisting of the vehicle body takes place, the front side robot and the rear side robot perform corrective operations to thereby carry out positioning of the vehicle body. Therefore, there is no need to provide a jig coupling mechanism, a support column, and a coupling tool, etc., that are high in rigidity. In addition, it is also possible to avoid an increase in the size and scale of the assembly apparatus 10. More specifically, the structure of the assembly apparatus 10 can be simplified.

Further, when the dimensions of the side panels 12 and the roof panel 14 differ due to differing vehicle types, the amounts of displacement of the roof positioning members 72a, 72b, 74a, 74b or the side panel positioning members 64a, 64b, 66a, 66b may be changed appropriately. In this manner, the assembly apparatus 10 is superior in terms of versatility.

The present invention is not limited in particular to the above-described embodiment, and various modifications thereto are possible without deviating from the essence and gist of the present invention.

Figure 5:
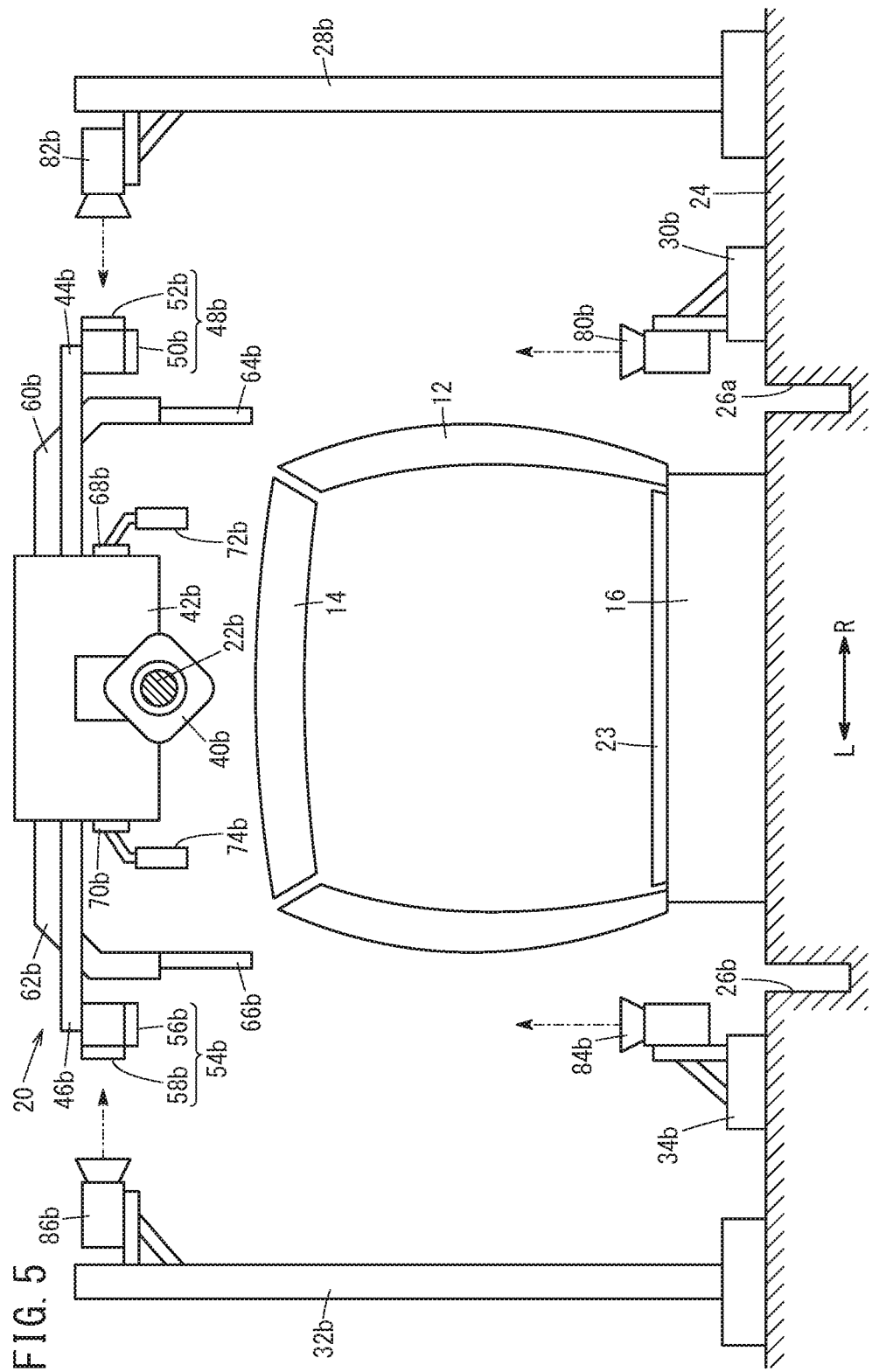
FIG. 5 is a schematic rear view of principal components of an assembly apparatus by which marking members are detected with visual sensors at positions different from that shown in FIG. 1.

For example, according to the present embodiment, after the roof panel 14 and the side panels 12 have been positioned by the roof positioning members 72a, 72b, 74a, 74b and the side panel positioning members 64a, 64b, 66a, 66b, the corrective operations of the front side robot and the rear side robot are performed in order to correct the posture of the vehicle body. However, as shown in FIG. 5, the amount of twisting of the front positioning mechanism 18 and the rear positioning mechanism 20 upwardly of the vehicle body may be obtained prior to positioning of the roof panel 14 and the side panels 12, and from this state, correction to the posture of the vehicle body may be carried out. Moreover, in this case, the installation positions of the front upper right visual sensor 82a, the front upper left visual sensor 86a, the rear upper right visual sensor 82b, and the rear upper left visual sensor 86b may be located higher than in the case shown in FIG. 1.

What is claimed is:

1. An assembly apparatus for assembling a vehicle body by attaching a roof panel to side panels, and comprising a positioning mechanism for aligning positions of the side panels and the roof panel, wherein the positioning mechanism comprises: a robot; a base portion attached to a distal end arm of the robot; roof positioning members supported on the base portion on outer sides thereof in a vehicle widthwise direction and laterally movable independently of each other in the vehicle widthwise direction so that the roof panel is positioned; side panel positioning members supported on the base portion on outer sides thereof in the vehicle widthwise direction and laterally movable independently of each other in the vehicle widthwise direction so that the side panels are positioned; a first beam member and a second beam member positioned and fixed to the base portion and extending respectively from the base portion rightward and leftward in the vehicle widthwise direction; a right marking member disposed on a distal end of the first beam member and facing toward an outer right side of the vehicle; a left marking member disposed on a distal end of the second beam member and facing toward an outer left side of the vehicle; a left visual sensor positioned and fixed so as to face the left marking member to detect a position of the left marking member; and a right visual sensor positioned and fixed so as to face the right marking member to detect a position of the right marking member; wherein the left visual sensor and the right visual sensor are disposed respectively on left and right sides of the vehicle body, wherein the left and right visual sensors detect a degree to which amounts of positional deviation have occurred to the front and rear as well as the right and left of the left and right marking members, in a state where the roof positioning members are applying pressure to the roof panel and the side panel positioning members are applying pressure to the side panels, the apparatus obtains an amount of three dimensional deviation from a reference posture of the vehicle body based on the detected amounts of positional deviation, and the robot performs corrective operation to reduce the amount of three dimensional deviation to zero.

2. The assembly apparatus according to claim 1, further comprising a moving mechanism which is capable of moving the vehicle body along a longitudinal direction of the vehicle body, together with a first groove and a second groove being formed respectively on right and left sides in the vehicle widthwise direction of the moving mechanism;
wherein the left visual sensor and the right visual sensor and the robot are installed externally of the first groove and the second groove.

3. The assembly apparatus according to claim 1, wherein the left visual sensor and the right visual sensor are cameras.

4. The assembly apparatus according to claim 1, wherein the left marking member and the right marking member are arranged more outwardly in the vehicle widthwise direction than the roof positioning members and the side panel positioning members.

5. The assembly apparatus according to claim 1, wherein the roof positioning members are configured to be displaced along the vehicle widthwise direction and a vehicle heightwise direction, and the side panel positioning members are configured to be displaced along the vehicle widthwise direction.

6. The assembly apparatus according to claim 5, wherein the roof positioning members and the side panel positioning members are configured to be displaced by a ball screw mechanism, a rack and pinion mechanism, or an air cylinder mechanism.

7. The assembly apparatus according to claim 1, wherein:
the left visual sensor comprises a lower left visual sensor having an optical axis which is oriented upward, and being configured to detect front and rear and left and right displacements of the left marking member, and an upper left visual sensor having an optical axis which is oriented inwardly in the vehicle widthwise direction, and being configured to detect front and rear displacements and vertical displacements of the left marking member;
the right visual sensor comprises a lower right visual sensor having an optical axis which is oriented upward, and being configured to detect front and rear and left and right displacements of the right marking member, and an upper right visual sensor having an optical axis which is oriented inwardly in the vehicle widthwise direction, and being configured to detect front and rear displacements and vertical displacements of the right marking member; and
the upper right visual sensor is supported by a first support column, and the upper left visual sensor is supported by a second support column.

8. The assembly apparatus according to claim 7, wherein the left marking member includes a lower left marking detected by the lower left visual sensor, and a left side marking detected by the upper left visual sensor, and the right marking member includes a lower right marking detected by the lower right visual sensor, and a right side marking detected by the upper right visual sensor.

9. The assembly apparatus according to claim 7, wherein the lower left visual sensor, the upper left visual sensor, the lower right visual sensor, and the upper right visual sensor are cameras.

* * * * *